No. 695,583. Patented Mar. 18, 1902.
N. SCHIETKIEWICS.
PROCESS OF PREPARING FOUNDATIONS.
(Application filed Aug. 22, 1901.)
(No Model.)
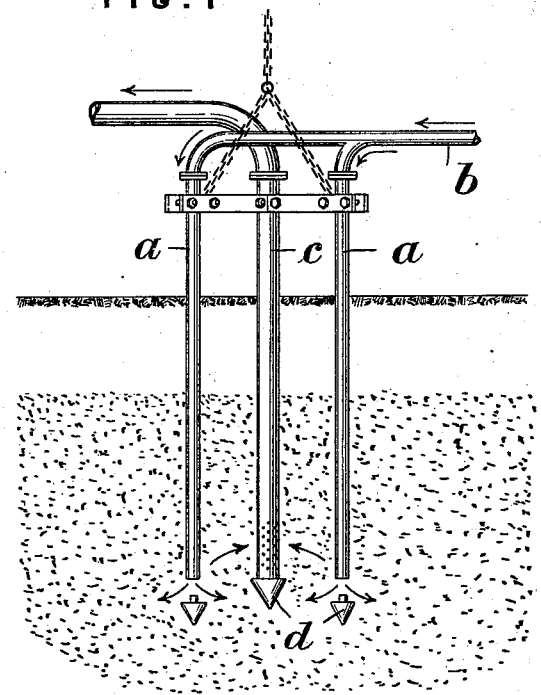
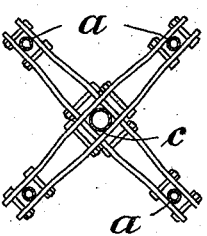
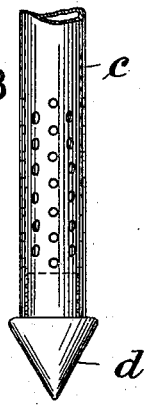
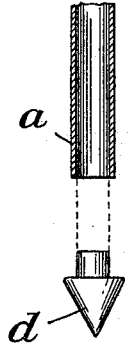
WITNESSES:
Isabella Waldron
Mildred Welch
INVENTOR.
Nicolas Schietkiewics
BY
Richards & Co.
ATTORNEYS

UNITED STATES PATENT OFFICE.

NICOLAS SCHIETKIEWICS, OF ST. PETERSBURG, RUSSIA.

PROCESS OF PREPARING FOUNDATIONS.

SPECIFICATION forming part of Letters Patent No. 695,583, dated March 18, 1902.

Application filed August 22, 1901. Serial No. 72,919. (No specimens.)

*To all whom it may concern:*

Be it known that I, NICOLAS SCHIETKIEWICS, a subject of the Emperor of Russia, and a resident of St. Petersburg, Russia, have invented certain new and useful Improvements in Methods of Preparing Foundations for Buildings, of which the following is a specification.

The present invention consists of a process for preparing foundations for building and other purposes.

In the case of loose soil, such as sand or gravel, it has been proposed to render the same stable enough for building purposes by impregnating it with thin fluid cement. This cement binds with the sand and forms a sufficiently hard and fast concrete mass, serving as a foundation. This process is, however, dependent on certain conditions. Thus, for instance, the soil must not contain water. It must be perfectly dry.

If wet or having much ground water or in the case of quicksand, the process of hardening the soil cannot be carried out, because the water fills out the interstices of the sand and renders the penetration of the cement very difficult, and in addition to this the water further dilutes the cement, which is thin fluid already, so that it is practically impossible for the cement to bind and form a good foundation.

The object of the present invention is to obviate this disadvantage, and this is effected by drawing off the water simultaneously with the forcing in of the thin fluid cement. This enables the cement to be properly distributed and also renders it possible to force the cement into the soil at a less pressure than had to be employed for the purpose hitherto. It also enables the progress of the process to be controlled to a certain extent. Thus, for instance, if cement is drawn out through the suction-pipe with the water it will show that the process has been sufficiently carried out and that the soil is thoroughly impregnated with the cement.

In order to render the present specification easily intelligible, reference is had to the accompanying drawings, in which similar letters of reference denote similar parts throughout the several views.

Figure 1 is a side elevation of one form of device by means of which the present process may be carried out. Fig. 2 is a plan of the same; Fig. 3, a detail view of the end of one of the pipes, and Fig. 4 a similar view of the end of a pipe with the spike removed.

Four or more pipes $a$ are advantageously symmetrically arranged, for instance, in suitable cross-arms, as at $e$, and these pipes are all connected up to a common supply-pipe $b$, through which the thin fluid cement is fed to the same. In the center of the cross-arms a larger pipe $c$ is mounted, and this pipe is connected up to some suitable suction-pump or other suction device. The end of the central pipe is advantageously perforated and may be provided with a spike $d$ when the apparatus is forced into the ground. These spikes will then come off when the apparatus is slightly raised, as shown at Fig. 1, and leave the ends of the pipes open. If necessary, the apparatus may be weighted in order to have it properly enter the ground, or any suitable means may be employed for forcing it into the ground to be prepared.

In practice the apparatus is advantageously sunk to the greatest depth which it is desired to work and the cement forced through the pipes $a$, the water being simultaneously drawn off through pipe $c$, as indicated by the various arrows in Fig. 1. As soon as it is observed that the water being drawn off contains cement in it the ground will have been sufficiently saturated, and the apparatus should be raised a certain distance, so that the layer above that just worked may be impregnated, and so on. It is advantageous to have the cement-pipes symmetrically arranged around the suction-pipe.

The formation of the foundations will always be better the less clay the sand contains; but the present process is also adaptable for forming foundations in clay soils, provided the ground is previously prepared. In this case the apparatus is sunk and water is forced at first through the pipes $a$ and drawn by suction through the pipe $c$. This water washes out the clay particles, which can be observed by examination of the water drawn out at pipe $c$. When this water is tolerably clear, it may be assumed that the ground is sufficiently prepared to commence the concreting process. The water-supply to pipes *a* is then shut off and the cement-feed to the said pipes opened in the manner previously described.

I claim as my invention—

A process for forming foundations in loose soil such as sand or gravel, which consists in feeding thin fluid cement to the said soil and simultaneously drawing water from the same part by suction in the manner and for the purpose substantially as described.

In testimony that I claim the foregoing as my invention I have signed my name in presence of two subscribing witnesses.

NICOLAS SCHIETKIEWICS.

Witnesses:
N. D. FORNIN,
E. W. LOURIE, Jr.